United States Patent [19]

Hannart

[11] 3,761,483
[45] Sept. 25, 1973

[54] PROCESS FOR OBTAINING OCHROPAMINE

[75] Inventor: Jean Alfred Alphonse Joseph Hannart, Brussels, Belgium

[73] Assignee: Forschag Forschungsune Chemie AG, Basle, Switzerland

[22] Filed: Sept. 24, 1971

[21] Appl. No.: 183,693

[52] U.S. Cl. .................................... 260/293.55
[51] Int. Cl. .................................... C07d 57/00
[58] Field of Search .......................... 260/293.55

[56] References Cited
OTHER PUBLICATIONS

Douglas et al., Austral. J. Chem. 17, 246–55 (1964).

Zetler, Arzneimittel-Forsch. 14(12), 1277–86 (1964).

Primary Examiner—Henry R. Jiles
Assistant Examiner—G. Thomas Todd
Attorney—Richards & Geier

[57] ABSTRACT

The invention mainly pertains to a process for obtaining Ochropamine which comprises the steps of exhausting a vegetal drug by means of a solvent in an alkaline environment, separating the bases contained in the solvent by means of acid water, treating said acid water with a view to extracting therefrom the total alkaloids, and isolating the Ochropamine by chromatography, characterized in that said vegetal drug is the Cabucala Striolata Caudata.

1 Claim, No Drawings

PROCESS FOR OBTAINING OCHROPAMINE

The present invention relates to a process for obtaining Ochropamine as well as the Ochropamine thus obtained, particularly as a therapeutic product.

Ochropamine, an indole alkaloid, has been extracted from the Ochrosia, particularly Ochrosia Poweri (see B. Douglas, J.L. Kirkpatrick, B.P.Moore and J.A. Weisbach, Austral J.Chem.17, 246, 1964).

The Applicant has found that Ochropamine has antiviral properties, whereas its toxicity is very weak.

On the other hand, the Applicant has also found, that Ochropamine could be extracted from Cabucala, an Apocynacea of the tropical regions, and more particularly form the Cabucala Striolata Caudata. The part of this plant having the largest content are its leaves, from which, according to the samples, from 8 to 10.5 g. total alkaloids per kg dry leaves may be extracted, out of which 2 to 3.5 g of pure Ochropamine can be isolated.

The process according to the present invention comprises the steps of exhausting a vegetal drug by means of a solvent in an alkaline environment, separating the bases contained in the solvent by means of acid water, treating said acid water with a view to extracting therefrom the total alkaloids, and isolating the Ochropamine by chromatography, said process being characterized in that said vegetal drug is the Cabucala Striolata Caudata. Preferably the leaves of the latter are used.

The Ochropamine thus obtained clearly exhibits antiviral properties on tobacco mosaic and on the influenza virus. On the other hand the following pharmacodynamic properties may be noted:
Toxicity on mice — intravenous administration — DL 50 = 39 mg/kg.
With cats, acceleration of the respiratory rhythm and increased amplitude.
Decrease of fatigability with the rat.
Increased cursiosity — mice.
Slight increase of the arterial tension for 1/5th of the DL 50.
Small effect on the rhythm and amplitude of the heart.

An example to illustrate how the invention is to be carried into effect will be described in detail hereinafter.

Leaves of Cabucala Striolata are dried at the places of harvest, in thick layers, frequently stirred, in the shadow. It is also possible to dry the leaves in drying kilns ventilated with hot air. The drug is considered to be dry, when its water content has dropped to 12 percent.

The dry leaves are ground and 4 kg is weighed out. The powder is then alkalized by kneading it with 4 l of a watery solution of 10 percent sodium carbonate hydrate, then left to rest for 2 hours. The vegetal mass is then introduced into a Soxhlet type of extracting apparatus and exhausted during three hours by means of ethyl ether. At the end of this treatment 27.5 l of ether is obtained. This solvent is now concentrated so as to reduce its volume to 6 l. Then after filtration it is exhausted by 6 washings each of 500 ml of phosphoric water of 1 percent. In this way about 3 l water containing all the bases as phosphates is obtained. This water is stripped in vaccum of residual quantities of solvent, then stirred with 50 g of bone-black and filtered. After gradual alkalization by means of ammonia, the bases are extracted by stirring the aqueous phase with 250 ml of chloroform. 6 washings are effected with this solvent, then are joined, washed with water, dried on sodium sulfate, filtered and evaporated until dry. Thus one obtains 40 g total alkaloids, i.e. a yield of 10 g. per kg dry leaves.

The total alkaloids are dissolved in benzene and passed on a column of 1,500 g alumina. The following series of solvents is used for elution:

pure benzene benzene/ether 50—50 pure ether chloroform chloroform with 1% of methyl alcohol chloroform with 1.5% of methyl alcohol The Ochropamine is obtained in the chloroform fractions with low methyl alcohol content. The chromatography can be continued in order to obtain the other alkaloids, by increasing the methyl alcohol content of the chloroform.

The fractions containing the Ochropamine are joined and evaporated until they are dry. A residue of 17.5 g. is thus obtained. This is taken up again with ethyl alcohol en by concentration of the solvent yields a first cast of 8.15 g. and a second cast of 2.1 g, i.e. 10.25 g Ochropamine in total.

The Ochropamine thus obtained has the following confirmatory characteristics:
1. Melting point: 134° C.
2. Rotating power : $(\alpha)_D = -153°$(acetone)
3. Molecular formula : $C_{22}H_{26}O_3N_2$
4. Molecular weight : 366.44
5. Centesimal composition: C : 72.10
H : 7.15
OCH3 : 8.46
N : 7.65
6. U.V.Spectrum : 243(4.28) 315(4.25)
7. I.R.Spectrum : 3,400; 2,940; 2,770; 1,730; 1,715; 1,650; 1,615; 750
8. R.M.N.Spectrum: one quartet of 3 protons centered on 1.7
one singlet of 6 protons at 2.55;
one singlet of 3 protons at 4.03;
one quartet of 1 proton centered on 5.4
four aromatic protons between 7 and 8 ppm.
9. Mass spectrography: $M^+$-peak at 366 and principal peaks at 351, 334–335 323,307, 252, 222, 188, 180, 172, 143, 134, 122, 120, 115.

In consideration of these characteristics it may be concluded that the substance obtained really is Ochropamine, having the structural formula:

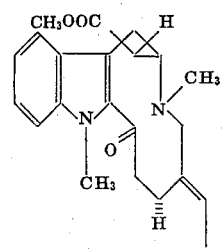

The invention also concerns, as a novel industrial product, the Ochropamine obtained by the application of

I claim:

1. A process for obtaining Ochropamine, which comprises exhausting a vegetal drug by means of a solvent in an alkaline environment, said vegetal drug being the powder of dried leaves of Cabucala Striolata Caudata, separating the bases contained in the solvent by acid water, treating said acid water to extract therefrom the total alkaloids and carrying out a chromatographic process to isolate the Ochropamine, elution in said chromatographic process being successively carried out with pure benzene, a mixture of 50 — 50 benzene and ether, pure ether, chloroform, chloroform with 1 percent % methyl alcohol added and chloroform with 1.5 percent methyl alcohol added, Ochropamine being obtained in the chloroform fractions with a low methyl alcohol content.

* * * * *

UNITED STATES PATENT OFFICE
CERTIFICATE OF CORRECTION

Patent No. 3,761,483          Dated September 25, 1973

Inventor(s) Jean Alfred Alphonse Joseph Hannart

It is certified that error appears in the above-identified patent and that said Letters Patent are hereby corrected as shown below:

On the cover sheet item [73] should read as follows:

-- FORSCHAG, FORSCHUNGS-UND CHEMIE AG, Basle, Switzerland --.

Signed and sealed this 30th day of April 1974.

(SEAL)
Attest:

EDWARD M. FLETCHER, JR.          C. MARSHALL DANN
Attesting Officer                  Commissioner of Patents